(12) United States Patent
Sukumar et al.

(10) Patent No.: US 11,052,806 B2
(45) Date of Patent: Jul. 6, 2021

(54) CONTAINER HOLDER INCLUDING IRIS-STYLE BLADES

(71) Applicant: GM Global Technology Operations LLC, Detroit, MI (US)

(72) Inventors: Nithish Sukumar, Karur (IN); Prathiba Ravindranath, Bangalore (IN); Michelle A. Wood, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 16/426,316

(22) Filed: May 30, 2019

(65) Prior Publication Data

US 2020/0376997 A1 Dec. 3, 2020

(51) Int. Cl.
*B60N 3/10* (2006.01)
*F16B 2/10* (2006.01)

(52) U.S. Cl.
CPC ............... *B60N 3/106* (2013.01); *F16B 2/10* (2013.01)

(58) Field of Classification Search
CPC .................................. B60N 3/106; F16B 2/10
See application file for complete search history.

(56) References Cited

U.S. PATENT DOCUMENTS

2016/0304019 A1* 10/2016 Dargavell .............. B60N 3/106

* cited by examiner

*Primary Examiner* — D Glenn Dayoan
*Assistant Examiner* — Melissa Ann Bonifazi

(57) ABSTRACT

A container holder for a vehicle is disclosed. The container holder defines a central axis. The container holder includes an inner body defining an innermost surface, where the innermost surface of the container holder is shaped to receive a bottom portion of a container. The container holder also includes an iris mechanism at least partially surrounding the inner body. The iris mechanism includes a plurality of blades that expand inwardly towards the central axis of the container holder and exert a clamping force upon a container placed within the inner body of the container holder.

15 Claims, 4 Drawing Sheets

CONTAINER HOLDER INCLUDING IRIS-STYLE BLADES

INTRODUCTION

The present disclosure relates to container holders for vehicles. More specifically, the present disclosure is directed towards a container holder having an iris style mechanism for securing a container in a vehicle.

A vehicle typically includes various devices and features for providing comfort and convenience to the driver and passengers. For example, a beverage or container holder may be provided within the interior cabin of the vehicle. The beverage container secures containers such as bottles, cans, travel mugs, and disposable cups.

Many container holders typically include an opening or cavity that is shaped to only secure cups and bottles of a particular size or circumference without excessive movement. In other words, many container holders are not able to accommodate beverage containers of different sizes. Therefore, relatively smaller beverage containers placed within the container holder may fall over and spill liquid as the vehicle is being driven down a street. The smaller beverage container may also move within the container holder as the vehicle is being driven, which in turn creates rattling or other noises. Also, if the container holder is located within a passenger door, then smaller beverage containers may fall over and spill liquid or rattle when the passenger door is opened or closed suddenly. All of these incidents may lead to customer dissatisfaction.

Thus, while current container holders achieve their intended purpose, there is a need for a new and improved system and method for securing containers within a container holder.

SUMMARY

According to several aspects, a container holder for a vehicle is disclosed. The container holder defines a central axis and includes an inner body defining an innermost surface, where the innermost surface of the container holder is shaped to receive a bottom portion of a container. The container holder also includes an iris mechanism at least partially surrounding the inner body, where the iris mechanism includes a plurality of blades that expand inwardly towards the central axis of the container holder and exert a clamping force upon a container placed within the inner body of the container holder.

In another aspect, the iris mechanism defines an adjustable aperture that is shaped to secure the container placed within the container holder.

In yet another aspect, the plurality of blades each define an arcuate edge that defines a portion of the adjustable aperture.

In still another aspect, the iris mechanism is configured to expand into a fully deployed position.

In another aspect, the container holder further includes an actuation ring and a plurality of sliding pins, where the blades are each rotatably connected to the actuation ring by a corresponding one of the plurality of sliding pins.

In yet another aspect, the actuation ring includes a plurality of slots, and each sliding pin is received by one of the plurality of slots.

In still another aspect, the container holder further includes a plurality of rotation pins and a base plate, where the plurality of blades are each rotatably mounted to the base plate by a corresponding one of the plurality of rotation pins.

In another aspect, the container holder also includes a slide that is operably connected to the iris mechanism by the actuation ring.

In yet another aspect, the slide is moveable within a slot, and movement of the slide within the slot either increases or decreases an amount of clamping force.

In an aspect, a trim component for a vehicle is disclosed. The trim component includes a container holder for a vehicle, where the container holder defines a central axis. The container holder includes an inner body defining an innermost surface, where the innermost surface of the container holder is shaped to receive a bottom portion of a container. The container holder also includes an iris mechanism at least partially surrounding the inner body, where the iris mechanism includes a plurality of blades that expand inwardly towards the central axis of the container holder and exert a clamping force upon a container placed within the inner body of the container holder, and the iris mechanism defines an adjustable aperture that is shaped to secure the container placed within the container holder.

In another aspect, the plurality of blades each define an arcuate edge that defines a portion of the adjustable aperture.

In yet another aspect, the iris mechanism is configured to expand into a fully deployed position.

In still another aspect, the trim component further includes an actuation ring and a plurality of sliding pins, where the blades are each rotatably connected to the actuation ring by a corresponding one of the plurality of sliding pins.

In another aspect, the actuation ring includes a plurality of slots, and wherein each sliding pin is received by one of the plurality of slots.

In yet another aspect, the trim component further includes a plurality of rotation pins and a base plate, where the plurality of blades are each rotatably mounted to the base plate by a corresponding one of the plurality of rotation pins.

In still another aspect, the trim component further includes a slide that is operably connected to the iris mechanism by the actuation ring.

In an aspect, a container holder for a vehicle is disclosed. The container holder defines a central axis and includes an inner body defining an innermost surface, where the innermost surface of the container holder is shaped to receive a bottom portion of a container. The container holder also includes an actuation ring at least partially surrounding the inner body of the container holder and rotatable about the central axis of the container holder, where the actuation ring includes a plurality of slots. The container holder also includes a plurality of shutters that each include mating edges, where each shutter is slidingly engaged with one of the plurality of slots of the actuation ring, and where the actuation ring rotates about the central axis from a closed position where the mating edges of the plurality of shutters each cooperate with one another to create a continuous surface that covers the inner body of the container holder and into an opened position where the plurality of shutters separate from one another to reveal the inner body of the container holder.

In another aspect, the plurality of shutters each include a receiving pin that is slidably engaged with one of the plurality of slots of the actuation ring.

In another aspect, the mating edge of each of the plurality of shutters correspond to a portion of a circumference of the inner body of the container holder.

In yet another aspect, the actuation ring surrounds an entire inner body of the container holder.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
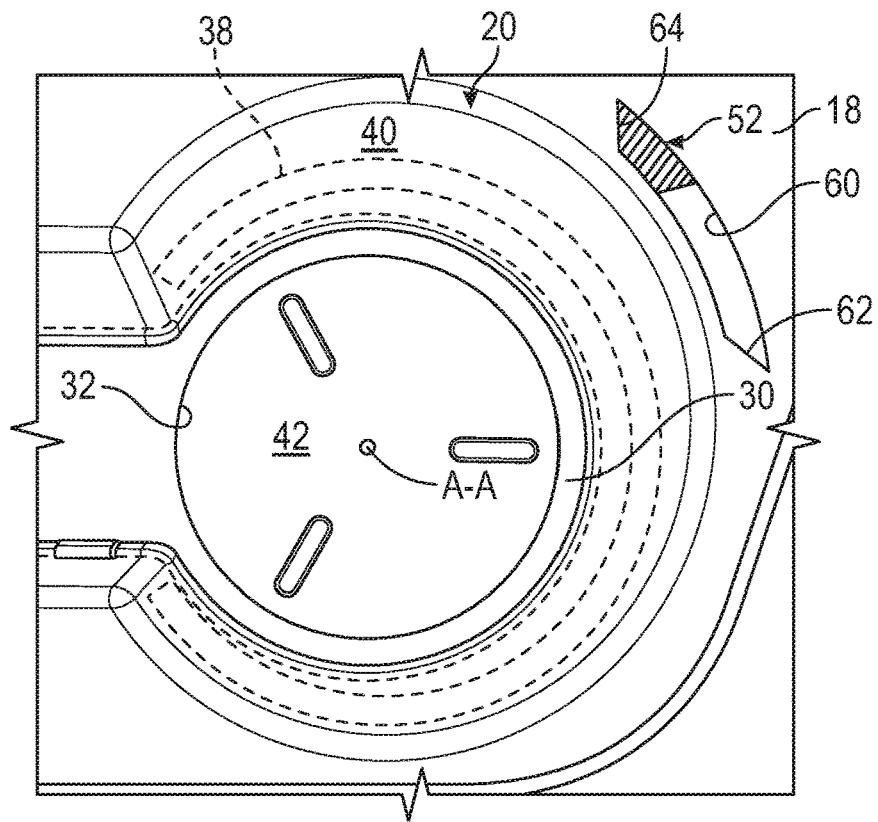
FIG. 1 is a top view of the disclosed container holder, where a plurality of blades for an iris mechanism are hidden, according to an exemplary embodiment.
Figure 2:
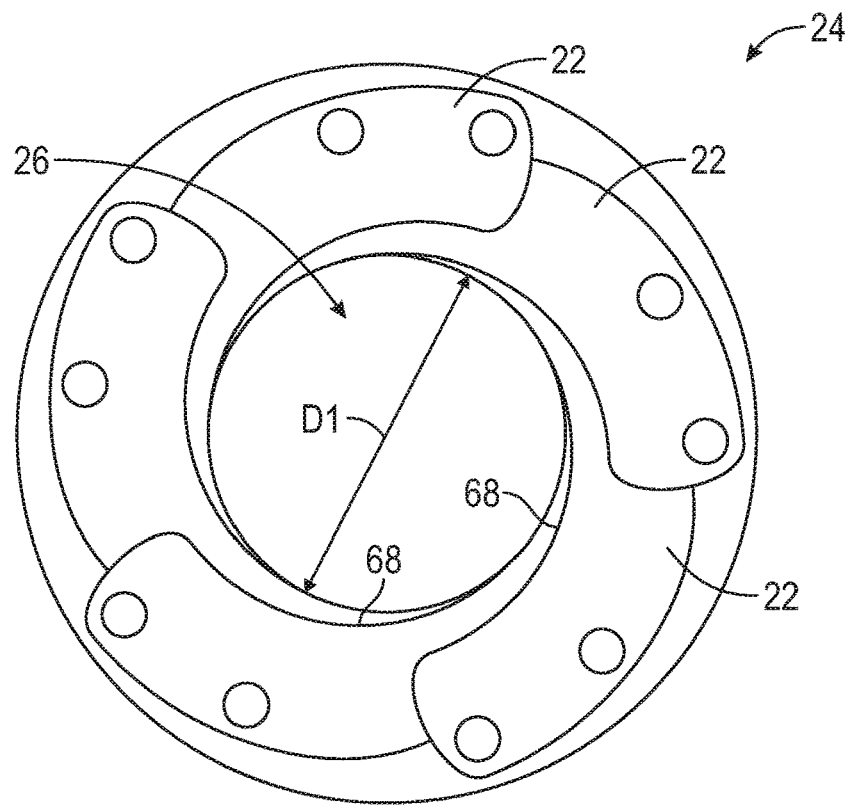
FIG. 2 is a top view of the plurality of blades of the iris mechanism in a stowed position, according to an exemplary embodiment.

FIG. 1 is a schematic illustration of a container holder 20. In an embodiment, container holder 20 is part of a trim component 18 for a vehicle. In an embodiment, the vehicle may be a motor vehicle such as a passenger car, truck, sport utility vehicle, van, or motor home. The trim component 18 may be any interior component that is mounted within the vehicle. Some examples of the trim component 18 include, but are not limited to, a door panel, a center console, or an armrest assembly. Referring to FIGS. 1 and 2, the container holder 20 includes a plurality of overlapping blades 22 that are part of an iris mechanism 24. As explained below, the iris mechanism 24 is configured to exert a clamping force upon a container (not shown) placed within the container holder 20.

Referring to both FIGS. 1 and 2, the container holder 20 is configured to hold a container securely in place without substantial movement. Specifically, as explained below, the blades 22 of the iris mechanism 24 create an adjustable aperture 26 to accommodate containers of different sizes or circumferences. In one non-limiting embodiment, the container is a beverage container such as a bottle or can containing water, a carbonated beverage, coffee, or fruit juice. However, it is to be appreciated that the container is not limited to a bottle for containing beverages. Instead, the container may be any vessel such as, but not limited to, travel mugs or disposable cups. Furthermore, the container is not limited to carrying beverages and liquids. Instead, in an embodiment the container may contain solid objects such as, for example, food.

Referring to FIG. 1, the container holder 20 includes an inner body 30 defining an innermost surface 32. The innermost surface 32 of the container holder 20 is shaped to receive a bottom portion of a container. At least a portion of the container holder 20 is surrounded by a slot 38. The slot 38 is shown in phantom line. It is to be appreciated that the slot 38 is disposed between an upper surface 40 and a lower surface 42 of the container holder 20. In the embodiment as shown in FIG. 1, a portion of the container holder 20 is surrounded by the slot 38, however it is to be appreciated that in another embodiment the slot 38 may surround the entire innermost surface 32. The slot 38 includes an arcuate profile.

FIG. 2 illustrates the iris mechanism 24 in a fully stowed position. When the iris mechanism 24 is in the fully stowed position, the adjustable aperture 26 is at a maximum size, and therefore may accommodate containers having a relatively large diameter. In other words, the adjustable aperture 26 is at a maximum diameter D1 when the iris mechanism 24 is at the fully stowed position. Referring to both FIGS. 1 and 2, when the container holder 20 is in a fully stowed position, the blades 22 are substantially hidden from view and are located within an interior of the trim component 18 (FIG. 1). The blades 22 of the iris mechanism 24 are configured to expand inwardly towards a central axis A-A of the container holder 20. As the blades 22 expand towards the central axis A-A, the blades 22 emerge gradually from of the slot 38 and become visible.

Figure 3:
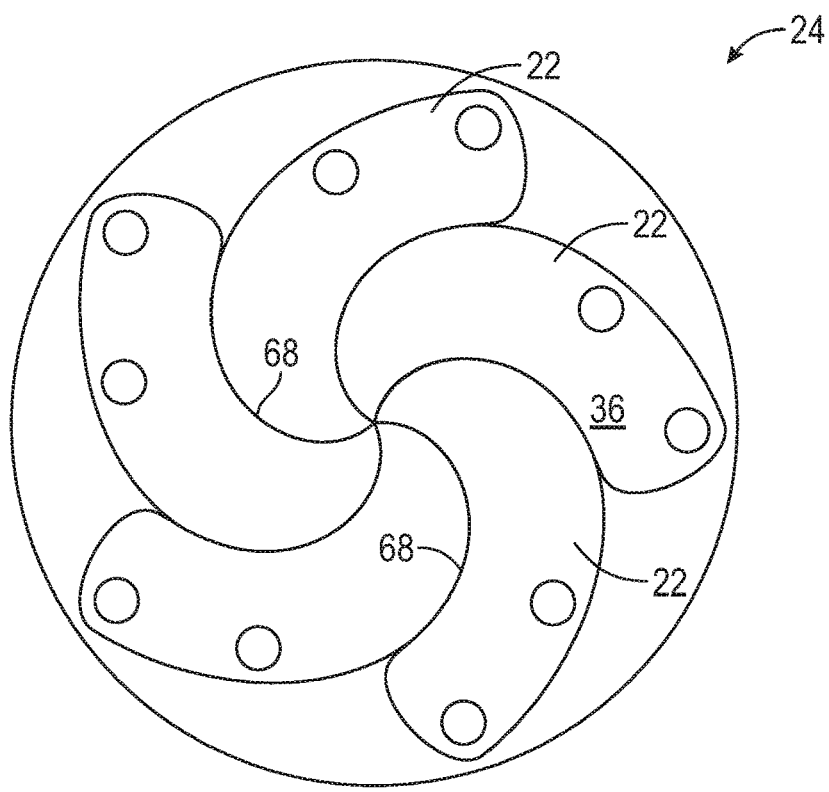
FIG. 3 is a top view of the plurality of blades of the iris mechanism in a deployed position, according to an exemplary embodiment.

FIG. 3 is an illustration of the iris mechanism 24 in a fully deployed position. When the blades 22 are positioned in the fully deployed position, the adjustable aperture 26 is fully closed. Referring to both FIGS. 1 and 3, when the iris mechanism 24 is in the fully deployed position, the innermost surface 32 of the container holder 20 is hidden. That is, the blades 22 cooperate with one another to create a continuous surface 36 that conceals the innermost surface 32 of the container holder 20.

Figure 4:
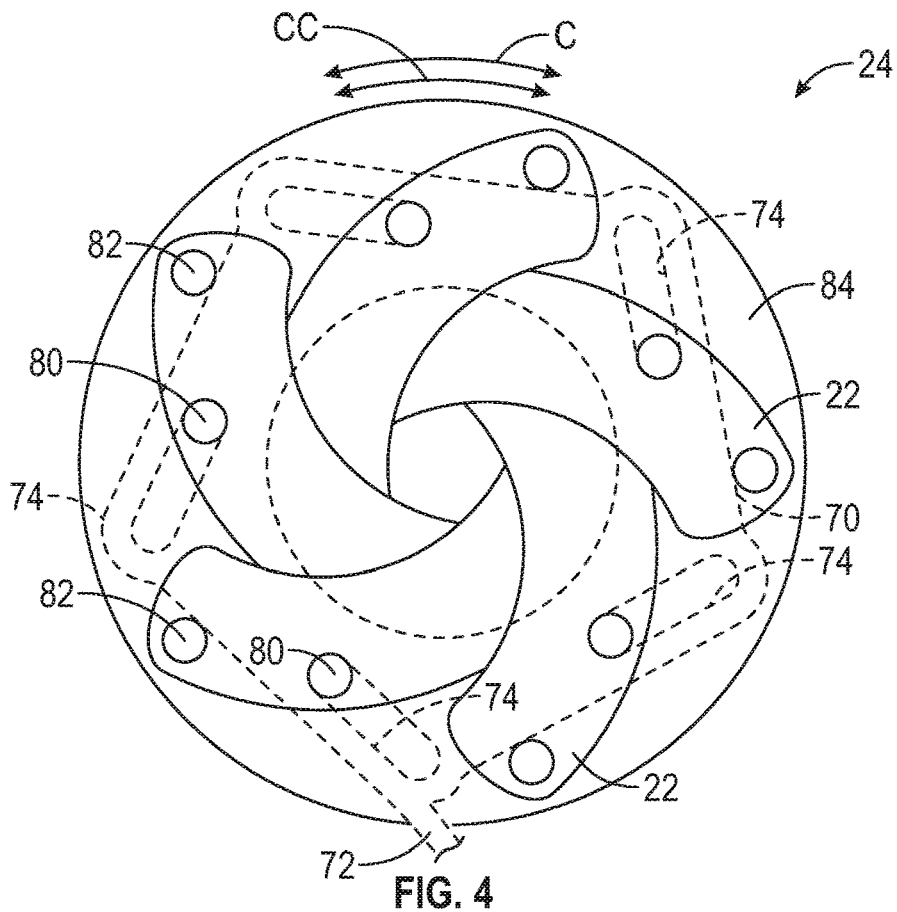
FIG. 4 is a top view of the iris mechanism with an actuation ring and a base plate, according to an exemplary embodiment.

Referring generally to FIGS. 1, 2, and 3, the iris mechanism 24 is placed into either the fully stowed position as seen in FIG. 2 or the fully deployed position as seen in FIG. 3 when no container is placed within the container holder 20. If the iris mechanism 24 is in the fully stowed position, then a container may simply be placed within the inner body 30 of the container holder 20. However, if the iris mechanism 24 is in the fully deployed position as seen in FIG. 3, then an operator actuates a slide 52 (seen in FIG. 1) located along the trim component 18 to retract the iris mechanism 24. Specifically, the iris mechanism 24 may be retracted into a position where the adjustable aperture 26 is sized to receive a bottom portion of the container. As explained in greater detail below and as shown in FIG. 4, the slide 52 is operably connected to the iris mechanism 24 of the container holder 20 by an actuation ring 70.

Once the container is seated within the inner body 30 of the container holder 20, the blades 22 may then be expanded towards the fully deployed position seen in FIG. 3, which in turn exerts a clamping force upon the container. The slide 52 is moveable within a slot 60, where movement of the slide 52 within the slot 60 either increases or decreases an amount of clamping force upon a container. With specific reference to FIG. 1, the slot 60 defines a first end stop 62 and a second end stop 64, where the slide 52 is actuated between the first end stop 62 and the second end stop 64 of the slot 60. For example, in one embodiment, when the slide 52 is directed towards the first end stop 62 the blades 22 expand towards the fully deployed position seen in FIG. 3. When the slide 52 abuts against the first end stop 62, then the iris mechanism 24 is in the fully deployed position. Likewise, when the slide 52 is directed towards the second end stop 64, then the blades 22 retract into the fully stowed position as seen in FIG. 2. When the slide 52 abuts against the second end stop 64, then the iris mechanism 24 is in the fully retracted position.

Referring to FIGS. 1, 2, and 3, the blades 22 each define an arcuate edge 68. The arcuate edge 68 of each blade 22 abuts against an outermost surface of the container, and thereby exerts the clamping force upon the container. An operator may either increase or decrease the clamping force by urging the slide 52 back and forth within the slot 60. Specifically, as the slide 52 travels towards the first end stop 62, the blades 22 are urged inwards and towards the central axis A-A, which in turn increases the clamping force exerted upon the container. Similarly, as the slide 52 travels towards the second end stop 64, the blades are urged away from the central axis A-A, which in turn decreases the clamping force exerted upon the container. Thus, movement of the slide 52 within its corresponding slot 60 may either increase or decrease the clamping force exerted by the blades 22 upon a container. Accordingly, an operator may adjust the clamping force exerted upon the container by the blades 22 to reduce or substantially eliminate rattling created by the container as the vehicle is driven.

Referring to FIGS. 1, 2, and 3, the iris mechanism 24 at least partially surrounds the inner body 30 of the container holder 20, where the plurality of blades 22 are configured to expand inwardly towards the central axis A-A of the container holder 20, which results in the blades 22 exerting a clamping force upon a container placed within the inner body 30 of the container holder 20. The iris mechanism 24 defines the adjustable aperture 26, which is shaped to secure a container placed within the container holder 20. As seen in both FIGS. 2 and 3, the arcuate edge 68 of each blade 22 defines a portion of the adjustable aperture 26. Referring now to FIG. 2, the adjustable aperture 26 is at the maximum diameter D1 when the iris mechanism 24 is in the fully stowed position. The iris mechanism 24 is also configured to expand into the fully deployed position seen in FIG. 3. It is to be appreciated that the blades 22 of the iris mechanism 24 are configured to contract and expand into an infinite number of positions. Accordingly, the container holder 20 is configured to accommodate containers of various sizes.

FIG. 4 illustrates the actuation ring 70 in phantom line, where the actuation ring 70 is configured to operably connect the plurality of blades 22 to the slide 52 (seen in FIG. 1). The actuation ring 70 includes an arm 72 and a plurality of slots 74. The arm 72 connects the actuation ring to the slide 52. Referring to both FIGS. 1 and 4, movement of the slide 52 within its corresponding slot 60 causes the actuation ring 70 to rotate in either a clockwise direction C or a counterclockwise direction CC about the central axis A-A of the container holder 20. Specifically, as the slide 52 travels towards the first end stop 62, this causes the actuation ring 70 to rotate in the clockwise direction C. As the actuation ring 70 travels in the clockwise direction C, the blades 22 expand into the fully deployed position as seen in FIG. 3. As the slide 50 travels towards the second end stop 64, this causes the actuation ring 70 to rotate in the counterclockwise direction CC. As the actuation ring 70 travels in the counterclockwise direction, the blades expand into the fully stowed position, which is seen in FIG. 2.

Continuing to refer to FIG. 4, the slots 74 in the actuation ring 70 each correspond to one of the blades 22. The iris mechanism 24 also includes a plurality of sliding pins 80, a plurality of rotation pins 82, and a base plate 84. The blades 22 are each rotatably mounted to the base plate 84 by a corresponding one of the rotation pins 82. Accordingly, each blade 22 expands and contracts by rotating about a respective rotation pin 82. The sliding pins 80 are each mounted upon a corresponding one of the blades 22. The sliding pins 80 are each received by one of the slots 74 in the actuation ring 70. As the actuation ring 70 rotates in either the clockwise direction C or the counterclockwise direction CC, the sliding pins 80 each move back and forth within their respective slots 74. Thus, the blades 22 are each rotatably connected to the actuation ring 70 by a corresponding one of the sliding pins 80.

Referring generally to FIGS. 1-4, the disclosed container holder provides several technical benefits and advantages. Specifically, the disclosed container holder includes an iris style mechanism, which includes an adjustable aperture that exerts a clamping force upon a container, such as a beverage container. The clamping force may prevent the beverage container from substantially vibrating within the container holder during operation of the vehicle, which in turn reduces or eliminates rattling and other noise concerns.

Figure 5A:
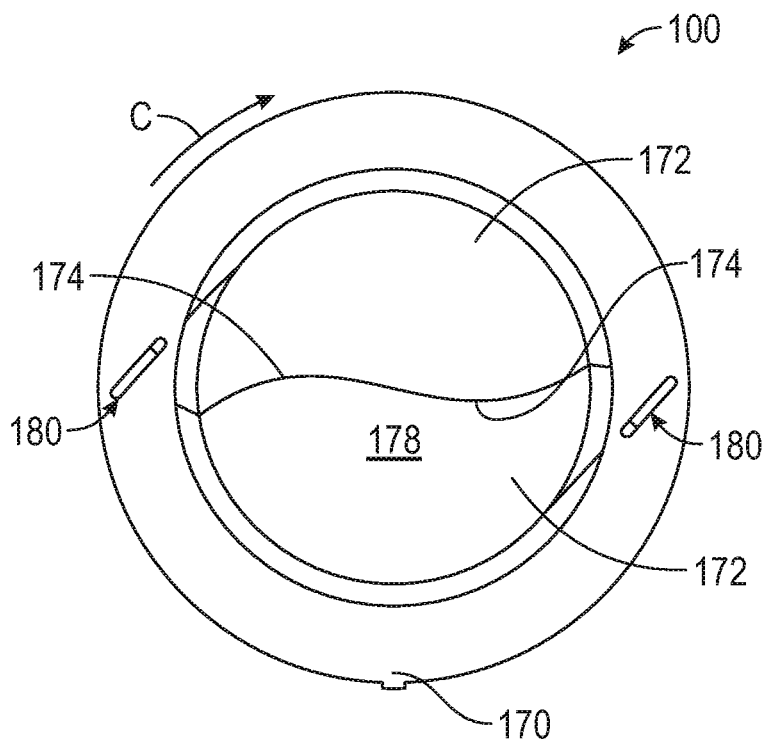
FIG. 5A is an alternative embodiment of a container holder having a plurality of shutters where the container holder is in a closed position, according to an exemplary embodiment.
Figure 5B:
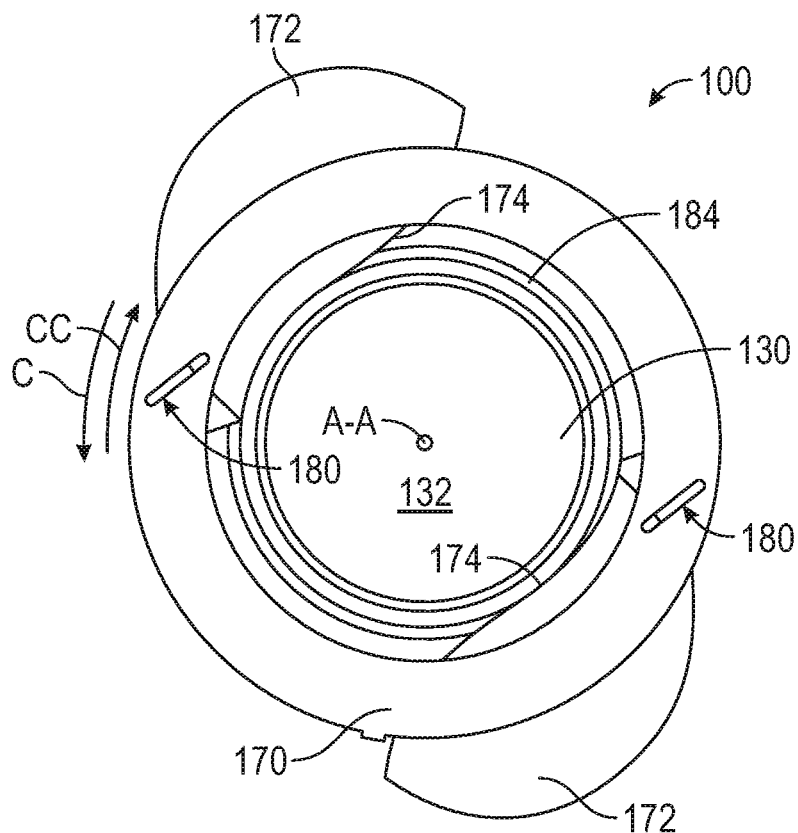
FIG. 5B illustrates the container shown in FIG. 5A in an opened position, according to an exemplary embodiment.

Referring now to FIGS. 5A and 5B, another embodiment of a container holder 100 is shown. The container holder 100 may also be part of a trim component for a vehicle as well. The container holder 100 includes a shutter-style mechanism that selectively hides an innermost surface 132 of the container holder 100 when the container holder 100 is not in use. Similar to the embodiment a shown in FIG. 1, the container holder 100 includes an inner body 130 defining the innermost surface 132, where the innermost surface 132 is shaped to receive a bottom portion of a container.

The container holder 100 includes an actuation ring 170 that at least partially surrounds the container holder 100. In the embodiment as shown in FIGS. 5A and 5B, the actuation ring 170 surrounds the entire container holder 100. The actuation ring 170 is rotatable about a central axis A-A of the container holder 100. The actuation ring 170 is connected to a plurality of shutters 172. The shutters 172 cover the innermost surface 132 of the container holder 100. Specifically, each shutter 172 includes a mating edge 174. The mating edges 174 of the shutters 172 correspond to one another to create a continuous surface 178 when the container holder 100 is in a closed position as seen in FIG. 5A. The continuous surface 178 may provide an aesthetically pleasing appearance to a passenger of the vehicle. Referring to FIG. 5B, the mating edge 174 of each shutter 172 corresponds to an outer circumference 184 of the inner body 130 of the container holder 100. Thus, when the container holder 100 is actuated into the opened position, the mating edge 174 of each shutter 172 aligns with a portion of the outer circumference 184 of the inner body 130 of the container holder 100, which is not only aesthetically pleasing but also ensures the shutters 172 do not interfere with a container that is placed into the inner body 130 of the container holder 100.

Figure 6A:
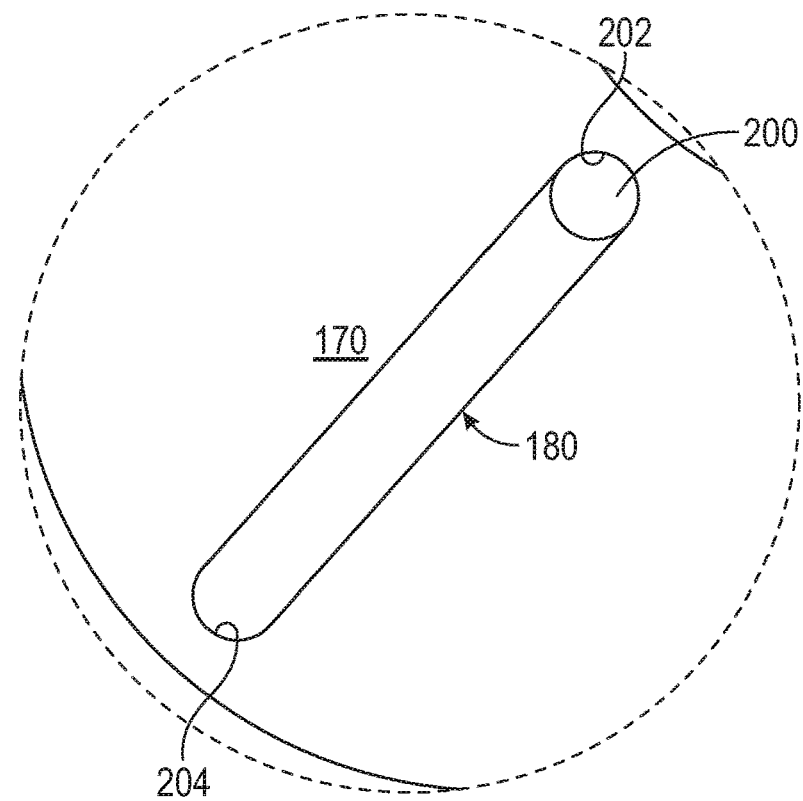
FIG. 6A illustrates a portion of an actuation ring of the container holder shown in FIG. 5A in the closed position, according to an exemplary embodiment.
Figure 6B:
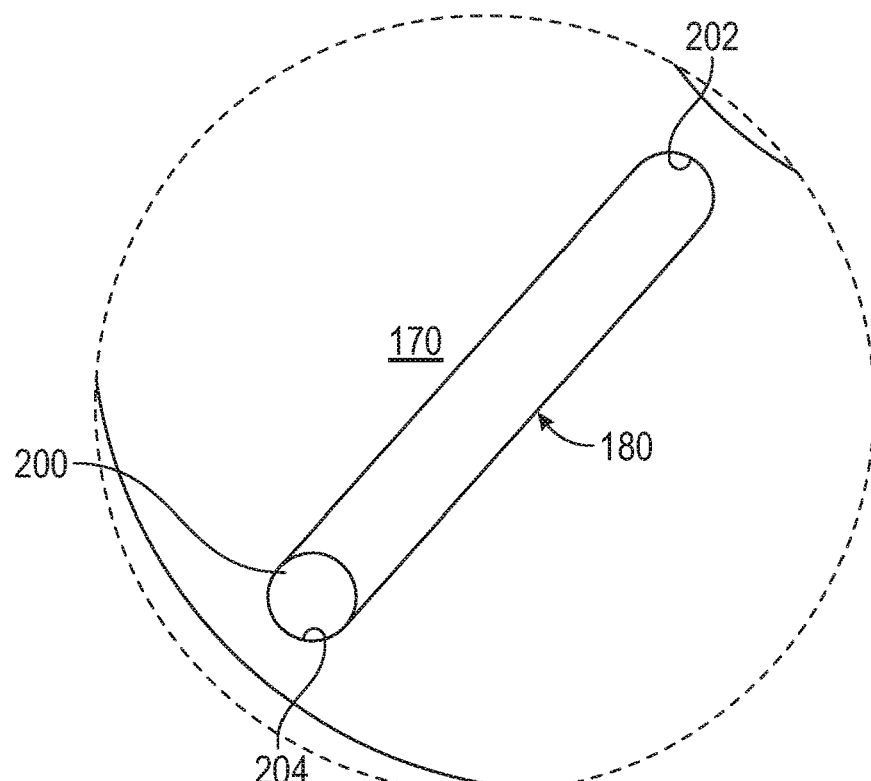
FIG. 6B illustrates the actuation ring of the container holder shown in FIG. 6A in the opened position, according to an exemplary embodiment.

The actuation ring 170 includes a plurality of slots 180 that each correspond to one of the shutters 172. The slots 180 are configured to actuate the shutters 172 from the closed position as seen in FIG. 5A and into the opened position as seen in FIG. 5B. Specifically, FIGS. 6A and 6B are an enlarged view of one of the slots 180. FIG. 6A corresponds to FIG. 5A and illustrates the slot 180 in the closed position. The shutter 172 corresponding to the specific slot 180 includes a receiving pin 200. The receiving pin 200 of the corresponding shutter 172 is slidably engaged with the slot 180. The slot 180 includes a first end 202 and a second end 204. When the container holder 100 is in the closed position, the receiving pin 200 of the corresponding shutter 172 abuts against the first end 202 of the slot 180.

A user may then decide to place a container within the container holder 100 by rotating the actuation ring 170. In the embodiment as shown in FIGS. 5A and 5B, the actuation ring 170 is configured to rotate about ten degrees in the clockwise direction C to actuate the shutters 172 into the opened position, however, it is to be appreciated that this illustration is merely exemplary in nature. For example, in another embodiment, a user may rotate the actuation ring 170 by more than ten degrees to actuate the shutters 172 into the opened position. Furthermore, a user may rotate the actuation ring 170 in either the clockwise C or the counter-clockwise direction CC to actuate the container holder 100 into the opened position. As seen in FIG. 6B, once the container holder 100 is in the opened position, the innermost surface 132 of the container holder 100 is revealed.

Referring specifically to FIGS. 5B and 6B, the receiving pin 200 of the corresponding shutter 172 slides within with the slot 180 as the actuation ring 170 rotates about the central axis A-A. Specifically, the receiving pin 200 slides from the first end 202 and towards the second end 204 of the slot 180. The receiving pin 200 continues to slide within the slot 180 until abutting against the second end 204 of the slot 180. It is to be appreciated that the shutters 172 actuate between the closed position and the opened position as their respective receiving pins 200 slide within their respective slots 180. Thus, the shutters 172 are moved away from the central axis A-A of the container holder 100 when in the opened position to thereby allow for a container to be placed within the inner body 130 of the container holder 100.

Referring generally to FIGS. 5A, 5B, 6A, and 6B, the plurality of shutters 172 each include mating edges 174, where each shutter 172 is slidingly engaged with one of the plurality of slots 180 of the actuation ring 170. The actuation ring 170 rotates about the central axis A-A of the container holder 100 from the closed position where the mating edges 174 of the plurality of shutters 172 each cooperate with one another to create a continuous surface 178 that covers the inner body 130 of the container holder 100 and into the opened position where the plurality of shutters 172 separate from one another to reveal the inner body 130 of the container holder 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A container holder for a vehicle, wherein the container holder defines a central axis, the container holder comprising:
   an inner body defining an innermost surface, wherein the innermost surface of the container holder is shaped to receive a bottom portion of a container;
   an iris mechanism at least partially surrounding the inner body, wherein the iris mechanism includes a plurality of blades that expand inwardly towards the central axis of the container holder and exert a clamping force upon a container placed within the inner body of the container holder;
   an actuation ring and a plurality of sliding pins, wherein the blades are each rotatably connected to the actuation ring by a corresponding one of the plurality of sliding pins; and
   a slide that is operably connected to the iris mechanism by the actuation ring.

2. The container holder of claim 1, wherein the iris mechanism defines an adjustable aperture that is shaped to secure the container placed within the container holder.

3. The container holder of claim 2, wherein the plurality of blades each define an arcuate edge that defines a portion of the adjustable aperture.

4. The container holder of claim 2, wherein the iris mechanism is configured to expand into a fully deployed position.

5. The container holder of claim 1, wherein the actuation ring includes a plurality of slots, and wherein each sliding pin is received by one of the plurality of slots.

6. The container holder of claim 1, further including a plurality of rotation pins and a base plate, wherein the plurality of blades are each rotatably mounted to the base plate by a corresponding one of the plurality of rotation pins.

7. The container holder of claim 1, wherein the slide is moveable within a slot, and wherein movement of the slide within the slot either increases or decreases an amount of clamping force.

8. A trim component for a vehicle, the trim component comprising:
   a container holder for a vehicle, wherein the container holder defines a central axis, the container holder comprising:
      an inner body defining an innermost surface, wherein the innermost surface of the container holder is shaped to receive a bottom portion of a container;
      an iris mechanism at least partially surrounding the inner body, wherein the iris mechanism includes a plurality of blades that expand inwardly towards the central axis of the container holder and exert a clamping force upon a container placed within the inner body of the container holder, and wherein the iris mechanism defines an adjustable aperture that is shaped to secure the container placed within the container holder;
      an actuation ring and a plurality of sliding pins, wherein the blades are each rotatably connected to the actuation ring by a corresponding one of the plurality of sliding pins; and
      a slide that is operably connected to the iris mechanism by the actuation ring.

9. The trim component of claim 8, wherein the plurality of blades each define an arcuate edge that defines a portion of the adjustable aperture.

10. The trim component of claim 8, wherein the iris mechanism is configured to expand into a fully deployed position.

11. The trim component of claim 8, wherein the actuation ring includes a plurality of slots, and wherein each sliding pin is received by one of the plurality of slots.

12. The trim component of claim 11, further including a plurality of rotation pins and a base plate, wherein the plurality of blades are each rotatably mounted to the base plate by a corresponding one of the plurality of rotation pins.

13. A container holder for a vehicle, wherein the container holder defines a central axis, the container holder comprising:

an inner body defining an innermost surface, wherein the innermost surface of the container holder is shaped to receive a bottom portion of a container;

an actuation ring at least partially surrounding the inner body of the container holder and rotatable about the central axis of the container holder, wherein the actuation ring includes a plurality of slots;

a plurality of shutters that each include mating edges, wherein each shutter is slidingly engaged with one of the plurality of slots of the actuation ring, and wherein the actuation ring rotates about the central axis from a closed position where the mating edges of the plurality of shutters each cooperate with one another to create a continuous surface that covers the inner body of the container holder and into an opened position where the plurality of shutters separate from one another to reveal the inner body of the container holder;

a plurality of sliding pins, wherein the plurality of shutters are each rotatably connected to the actuation ring by a corresponding one of the plurality of sliding pins; and a slide that is operably connected to the actuation ring.

14. The container holder of claim 13, wherein the mating edge of each of the plurality of shutters correspond to a portion of a circumference of the inner body of the container holder.

15. The container holder of claim 13, wherein the actuation ring surrounds an entire inner body of the container holder.

\* \* \* \* \*